Patented July 28, 1953

2,647,123

UNITED STATES PATENT OFFICE 2,647,123

N-(2-PYRIDYL) 2-CHLORO-3-AMINO-1,4-NAPHTHOQUINONES

Joseph C. Calandra, Chicago, Ill., and Ernest C. Adams, Jr., Elkhart, Ind., assignors to Research Corporation, New York, N. Y., a corporation of New York No Drawing. Application October 11, 1951, Serial No. 250,942

3 Claims. (Cl. 260—296)

This invention relates to a new group of N-substituted 2-chloro-3-amino-1,4-naphthoquinones which have been found to be useful as inhibitors of acid formation by oral bacteria and to a method of preparing the new compounds.

It has been found that 2-chloro-3-amino-1,4-naphthoquinones in which a hydrogen of the amino group is substituted by a wide variety of organic radicals are active inhibitors of acid production by bacteria in the oral cavity.

It has also been found that these compounds may be readily prepared by heating equimolecular quantities of organic amino compounds and 2,3-dichloro-1,4-naphthoquinone in a liquid organic solvent. In reacting sulfonamide compounds with the dichloronaphthoquinone it is advantageous to add a tertiary amine such as diethylaniline to the reaction mixture.

When two molecules of the dichloronaphthoquinone are used for each molecule of the amino compound the corresponding bis-naphthoquinonylimines are formed.

The following examples are typical of the method of the invention:

EXAMPLE 1

*2-chloro-3-(4-methyl-2-pyridylamino)-1,4-naphthoquinone*

Equimolar quantities of 2-amino-4-methylpyridine and 2,3-dichloro-1,4-naphthoquinone in 50 cc. of ethanol are refluxed for eighteen hours. The product which separates on cooling is recrystallized from ethanol forming golden crystals melting at 255° C. with decomposition.

Other compounds made by this method include:

2 - chloro - 3 - (2-pyridylamino) -1,4-naphthoquinone, yellow powder, melting at 276–278° C. with decomposition, from 2-aminopyridine;

2 - chloro - 3 - (5-methyl-2-pyridylamino) -1,4-naphthoquinone, orange needles melting at 261° C., from 2-amino-5-methylpyridine;

2,2' - (3-methyl-2-pyridylimino) -bis(3-chloro-1,4-naphthoquinone), yellow powder, melting at 176–178° C. with decomposition, from 2-amino-3-methylpyridine with two moles of the dichloronaphthoquinone;

2,2' - (6-methyl-2-pyridylimino) -bis(3-chloro-1,4-naphthoquinone), yellow crystals from aqueous ethanol, melting at 120° C. with decomposition, from 2-amino-6-methylpyridine with two moles of the dichloronaphthoquinone.

EXAMPLE 2

*$N^4$-(3-chloro-1,4-dihydro-1,4-dioxo-2-naphthyl)-$N'$-2-pyridylsulfanilamide*

A mixture of equimolecular quantities of sulfapyridine and 2,3-dichloro-1,4-naphthoquinone with 2.5 grams of diethylaniline in 50 cc. of ethanol is refluxed for eighteen hours. The product which separates on cooling is recrystallized from aqueous dioxane as red-orange crystals melting at 262° C. with decomposition.

The following compounds may likewise be made by the method of this example:

$N^4$ - (3 - chloro-1,4-dihydro-1,4-dioxo-2-naphthyl)-$N'$-2-thiazolylsulfanilamide, red crystals from ethanol, melting at 279–281° C. with decomposition, from sulfathiazole;

$N^4$ - (3 - chloro-1,4-dihydro-1,4-dioxo-2-naphthyl)-$N'$-2-pyrimidylsulfanilamide, orange powder from ethanol, melting at 256° C., from sulfadiazine;

$N^4$ - (3 - chloro-1,4-dihydro-1,4-dioxo-2-naphthyl) - $N'$-(4-methyl-2-pyrimidyl)sulfanilamide, red powder from ethanol, melting at 254° C., from sulfamerazine;

$N^4$ - (3 - chloro-1,4-dihydro-1,4-dioxo-2-naphthyl)-$N'$-quanylsulfanilamide, red powder from ethanol, melting at 272° C., from sulfaguanidine;

1 - (3 - chloro - 1,4-dihydro-1,4-dioxo-2-naphthyl)guanidine hemicarbonate from guanidine carbonate. Red crystals melting at 217–218° C. are obtained by evaporating the alcohol to give a black tar, extracting with hot water, clarifying the black aqueous solution with charcoal to give a red solution and evaporating the water from the red solution under vacuum.

Some amines react readily with the dichloronaphthoquinone without heating.

EXAMPLE 3

*2-chloro-3-n-decylamino-1,4-naphthoquinone*

Four grams of 2,3-dichloro-1,4-naphthoquinone and ten cc. of n-decylamine are shaken together for 15 minutes. The reaction product forms red crystals melting at 90–91° C.

In the same manner 2-chloro-3-(4-morpholinyl) - 1,4 - naphthoquinone is obtained from morpholine and the dichloronaphthoquinone as red crystals melting at 217–218° C.

EXAMPLE 4

*N-(3-chloro-1,4-dihydro-1,4-dioxo-2-naphthyl)-3-aminocaproic acid*

A mixture of equimolecular quantities of γ-amino-caproic acid and 2,3-dichloro-1,4-naphthoquinone in 50 cc. of acetone is refluxed for eighteen hours and poured into ice water. The reaction product is obtained as red crystals melting at 81–84° C.

We claim:
1. Compounds of the general formula

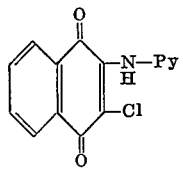

wherein Py is selected from the group consisting of 2-pyridyl and methyl-2-pyridyl.

2. 2-chloro-3-(4-methyl-2-pyridylamino)-1,4-naphthoquinone.

3. The method of making N-2-pyridyl substituted 2-chloro-3-amino-1,4-naphthoquinones which comprises refluxing a solution of 2,3-dichloro-1,4-naphthoquinone in a liquid organic solvent therefor with a substance of the group consisting of 2-pyridylamine and methyl-2-pyridylamine.

JOSEPH C. CALANDRA.
ERNEST C. ADAMS, Jr.

References Cited in the file of this patent
UNITED STATES PATENTS

| Number | Name | Date |
| --- | --- | --- |
| 2,541,473 | Leffler | Feb. 13, 1951 |

OTHER REFERENCES

Buu-Hoi: "Chem. Abst.," (1946), vol. 40, p. 2448.
Northey: "The Sulfonamides and Allied cpds.," (1948), pp. 111, 164.